United States Patent [19]
Mehra et al.

[11] Patent Number: 5,521,264
[45] Date of Patent: May 28, 1996

[54] GAS PHASE OLEFIN POLYMERIZATION PROCESS WITH RECOVERY OF MONOMERS FROM REACTOR VENT GAS BY ABSORPTION

[75] Inventors: Yuv R. Mehra, The Woodlands; Robert H. Stodghill, Houston, both of Tex.

[73] Assignee: Advanced Extraction Technologies, Inc., Houston, Tex.

[21] Appl. No.: 398,349

[22] Filed: Aug. 3, 1995

[51] Int. Cl.$^6$ ........................................... C08F 2/34
[52] U.S. Cl. ........................ 526/68; 526/69; 526/70; 526/901; 95/143; 95/237; 95/240; 95/238
[58] Field of Search ................. 526/68, 69, 70, 526/901; 62/20; 95/143, 237, 240, 238

[56] References Cited

U.S. PATENT DOCUMENTS

| | | |
|---|---|---|
| 4,035,167 | 7/1977 | Starks . |
| 4,340,701 | 7/1982 | Willmore et al. . |
| 4,372,758 | 2/1983 | Bobst et al. . |
| 4,482,687 | 11/1984 | Nashay et al. ........................... 526/125 |
| 4,521,573 | 6/1985 | Lee et al. ................................ 526/125 |
| 4,588,790 | 5/1986 | Jenkins et al. . |
| 4,666,998 | 5/1987 | Hagerty . |
| 4,740,222 | 4/1988 | Mehra . |
| 4,743,282 | 5/1988 | Mehra ......................................... 62/17 |
| 4,781,896 | 11/1988 | Willmore et al. . |
| 4,820,463 | 4/1989 | Raufast . |
| 4,832,718 | 5/1989 | Mehra . |
| 5,019,143 | 5/1991 | Mehra . |
| 5,220,097 | 6/1993 | Lam et al. . |
| 5,241,023 | 8/1993 | Brule et al. . |
| 5,266,276 | 11/1993 | Chinh et al. . |
| 5,326,929 | 7/1994 | Mehra et al. . |
| 5,376,742 | 12/1994 | Krause . |

FOREIGN PATENT DOCUMENTS 0071430 3/1986 European Pat. Off. .
4217611 12/1993 Germany .

OTHER PUBLICATIONS

Bauer, "Safe Ethylene Recovery from FCC Off–Gas Streams," Prepared for Presentation at AIChE 1994 Spring National Meeting, Atlanta, Georgia (Apr. 17–21, 1994).
Mehra, "Can We Really Afford to Keep Burning Light Olefins and Hydrogen in our Refineries?," CMAI Seminar, Houston, Texas (Mar. 24–25, 1993), pp. 1–10.
Mehra, "Processing Hydrocarbon Gases with the Mehra Process™ Technology," Chemical Engineering (Oct. 27, 1986), Houston, Texas.
Fair et al., "Ethylene Purification—Demethanization," Chemical Eng. Progress, vol. 54, No. 12 (Dec. 1958), pp. 39–47.

*Primary Examiner*—David W. Wu
*Attorney, Agent, or Firm*—Arnold, White & Durkee

[57] ABSTRACT

A process for gas phase polymerization of olefins wherein reactor vent gas stream(s) comprising unreacted monomers and light components are treated in an absorption process to recover the monomers. The absorption process comprises contacting the reactor vent gas stream(s) with an absorption solvent in an absorption zone to produce a gas stream comprising the light components, and a liquid stream comprising the absorption solvent and absorbed monomers. The liquid stream is fractionated in a distillation column to produce a distillation column bottoms stream that is the absorption solvent which is conveyed to the absorption zone, and an overhead stream comprising the monomers which can be conveyed to the reactor. In a preferred embodiment, the absorption solvent consists essentially of components derived from the reactor vent gas stream(s) so that no external solvent is required.

25 Claims, 2 Drawing Sheets

GAS PHASE OLEFIN POLYMERIZATION PROCESS WITH RECOVERY OF MONOMERS FROM REACTOR VENT GAS BY ABSORPTION

FIELD OF THE INVENTION

This invention relates to gas phase polymerization of olefins wherein unreacted monomers in vent gas streams emitted from the process are recovered using physical absorption techniques and recycled.

BACKGROUND OF THE INVENTION

Gas phase polymerization is the predominant reactor technology used to produce olefin plastic resins. The catalysts are contained in solid substrate particles from which the polymer chains grow. The particles are fluidized in a fluidized bed by a gas stream containing the monomers.

Gas phase fluidized bed reactors are used to produce linear low density polyethylene (LLDPE) resins, which are the largest and fastest growing segment of the polymer market. LLDPE resins are copolymers of ethylene and from between about 3% to about 10% by weight an alpha-olefin comonomer. Suitable alpha olefin comonomers for LLDPE resins include propylene; butene 1; 4-methyl pentene-1; hexene-1; and octene-1. Butene-1 and hexene-1 are used in highest volume. LLDPE resins are characterized and defined by their density which is in the range of between about 0.91 and 0.94 g/cc. Gas phase reactors are also used to produce the ethylene homopolymers, high density polyethylene (HDPE), which has a density in the range of between about 0.94 and 0.98 g/cc.

Over 50% of LLDPE production is used to make films and stretch wrap packaging. LLDPE resins are also used in wire and cable insulation and jacketing, rotomolding applications, pipe and conduit, and blow molding and extrusion coating applications.

In 1992 about 3,500,000 tons of LLDPE resins were produced in the U.S. using fluidized bed gas phase technology. A limited volume of ethylene-propylene elastomers for specialized applications are produced using fluidized bed technology and Ziegler-Natta catalysts.

The polymerization reactions are exothermic. The heat of reaction is absorbed by the reactor gas as sensible heat which increases the temperature as it flows up through the reactor. The heat of reaction is dissipated by cooling the reactor gas stream in heat exchangers prior to recycling the gas to the reactor inlet.

In recent designs the heat removal capacity of the reactor is significantly increased by adding catalytically inert condensible liquids such as penlane or hexane to the reactor feed gas stream. This development flies in the face of long-standing conventional wisdom which taught that stable fluidization could not be sustained if the reactor gas contained more than a minor amount of liquid. This is an important development because, in general, heat removal capacity is the major bottleneck that limits production capacity of the reaction section. The liquids vaporize in the reaction zone, thus increasing the heat removal capacity in the reactor by absorbing heat of vaporization (latent heat) in addition to the sensible heat increase of the reactor gas. The inert condensibles are condensed in the recycle heat exchangers and the liquid is recycled to the reactor, either entrained in the recycle gas stream or separated and recycled to the reactor as a separate liquid stream.

Polymerization reaction temperature is typically in the range from about 85° F. to about 220° F. and pressure from about 150 to about 350 psig. Ethylene partial pressure in the reactor gas phase is typically in range of from about 20 to about 150 psia and comonomer partial pressure is typically in the range of from about 5 to 50 psia. The gas phase typically includes nitrogen (or other inert gas) to provide sufficient linear velocity for smooth fluidization, and to makeup the difference between the partial pressure of the monomers and the total pressure required in the gas phase. Nitrogen also is a sensible heat sink which absorbs heat of reaction with increase of temperature as the reactor gas flows up through the reactor. A small amount of hydrogen is added to the gas phase to control the molecular weight (melt index) of the polymer via chain transfer reactions.

To maintain the fluidized bed at a constant height, polymer reactor product in the form of a fine granular powder is continually discharged from the reactor entrained in a stream of reactor gas at a rate equal to the rate of polymer formation in the reactor. The reactor product is discharged into a product discharge tank in which most of the reactor gas is separated from the product polymer powder and the separated reactor gas is recycled back to the reactor. Typically, the reactor product powder is conveyed out of the discharge tank by a stream of nitrogen or other inert gas into a product purge tank. The reactor product flowing from the product discharge tank unavoidably carries entrained reactor gas that contains unreacted monomers and solvents as well as the purge nitrogen. The product polymer also contains monomers and solvent that are dissolved and physically adsorbed in the polymer.

Entrained and adsorbed reactor gas must be removed from the product polymer powder before the product is conveyed on to storage or further processing to preclude forming explosive gas mixtures. Otherwise, the monomers and other hydrocarbons will diffuse out of the product polymer powder in downstream vessels which contain air. The requisite purging is accomplished in the product purge tank by blowing a stream of nitrogen countercurrently up from the bottom of the purge tank through the polymer. This flushes out entrained reactor gas and strips and desorbs dissolved hydrocarbons out of the product powder.

Typically, the vent gas stream is disposed of by burning it in a flare stack. Following are typical stream rates for the vent gas stream from the product purge tank in an LLDPE unit producing 22,000 lbs. per hour of an LLDPE butene-1 copolymer using hexane as the cocatalyst/activator solvent:

| Component | Flow Rate (lb./hr) |
|---|---|
| Ethylene | 265 |
| Butene-1 | 238 |
| Hexane | 25 |
| Nitrogen | 610 |
| Ethane | 27 |
| Hydrogen | 1 |
| C4's | 15 |

The comonomers lost in product vent stream represent a substantial economic loss to polyolefin producers. Also, there is the continually rising cost of disposing of the vent gas to meet air quality protection codes. Typically, from about one to about two percent of the ethylene fed to the process is lost in the vent gas stream. Comonomer losses are much higher ranging from about 10% for butene-1 to about 50% for hexene-1. The fraction of comonomer that is lost in the vent gas stream increases with molecular weight of the comonomer because the solubility of comonomer in the product polyolefin increases with the molecular weight of the comonomer. Monomer and comonomer vent losses add between about one to two cents per pound to the cost of making polyolefins which is a substantial sum considering that worldwide production of gas phase polyolefins is approaching 20 million tons per year. In addition, the vent gas also contains significant amounts of hydrocarbon solvents such as hexane which also have value.

Thermal cracking of hydrocarbon feedstocks is the primary production route to ethylene and other olefin monomers. The high cost of olefins and the large capital investments for new thermal cracking plants logically should motivate olefin polymerization operators to recover ethylene and comonomer olefins from polyolefin reactor vent streams before purchasing monomers. Why don't polyolefin operators recover ethylene and other valuable components from vent gas streams? The answer is that the only technology currently on the market to recover monomers from vent gas is cryogenic technology and with the cryogenic processes currently available, it is cheaper for operators to buy or produce makeup monomers than to recover the monomers from vent gas. Moreover, cryogenic processes are not flexible and do not adapt to changes in feed composition and feed gas flow rates that occur in polyolefin plants. So that although monomer recovery from polyolefin reactor vent gases is technically feasible, it is impractical using currently available commercial cryogenic recovery processes.

For the foregoing reasons, there is need for a flexible and cost effective process for recovering ethylene, other alpha olefin comonomers and hydrocarbon solvents from vent gases emitted from gas phase olefin polymerization plants.

The solution lies in Mehra processes which are absorption processes that utilize a physical absorption solvent to separate and recover hydrogen, nitrogen, methane, ethylene and other valuable hydrocarbons from mixed hydrocarbon streams. Mehra technology has been applied to recover ethylene, hydrogen and methane from refinery and petrochemical off-gas streams and to reject nitrogen from natural gas. Generally, Mehra processes compete with cryogenic processes in these applications. Depending on the application, Mehra specifies absorption solvents that are selected from preferred groups and process designs which optimally synergize solvent with process. Among the preferred Mehra solvents are C4 to C10 hydrocarbons including paraffins, naphthenes and aromatics. Mehra technology is described in U.S. Pat. Nos. 4,832,718, 4,740,222, 5,019,143, 5,220,097 and 5,326,929, which are incorporated herein by reference.

In general, Mehra processes operate at a higher temperature than cryogenic processes which provides advantages over cryogenic processes: 1) Exotic cryogenic construction materials required to withstand cryogenic temperatures are not required in Mehra processes; 2) Feed purification specifications are more relaxed; 3) Cryogenic processes are intensively heat integrated to reduce energy consumption whereas Mehra processes are not. Accordingly, Mehra processes are more flexible and adaptable to changes. Process conditions can be changed quickly "on-line" with no adverse impact on operability and without equipment modifications to alter product stream compositions or maintain product composition should feed composition change.

SUMMARY OF THE INVENTION

The present invention is directed to a gas phase olefin polymerization process wherein the vent gas streams emitted from the process contain unreacted ethylene and higher alpha olefins, cocatalyst solvent, and inert condensibles. The vent gases are processed to recover the monomers, solvents and inert condensibles. The recovered components are recycled back to the reactor or conveyed to a downstream purification unit such as the light ends section of an ethylene plant or ethylene splitter. The recovery technology employed is Mehra physical absorption technology. In a preferred embodiment of the process of the present invention the Mehra solvent can be produced within the process from heavy hydrocarbon components in the feed stream; no external solvent is required. Alternatively, the absorption solvent can be an external solvent that meets the Mehra criteria, such as pentane or hexane. However, using an external solvent requires additional solvent storage, handling and makeup costs which raise the cost of recovering the monomers.

The Mehra unit of the present invention includes the steps of:

(a) continuously and countercurrently contacting the vent gas stream(s) from an olefin polymerization reactor with an absorption solvent stream in an absorption zone to produce an absorption zone overhead gas stream comprised of hydrogen, nitrogen and other light components, and an absorption zone bottoms liquid stream comprised of the absorption solvent and absorbed ethylene, comonomers and heavy hydrocarbon solvents;

(b) fractionating the absorption bottoms stream in a monomer distillation column to produce an overhead stream comprising ethylene, comonomers and heavy hydrocarbons, and a liquid bottoms stream consisting essentially of heavy hydrocarbons; and (c) feeding the bottoms stream from the monomer distillation column to the absorption zone as the absorption solvent in step (a).

In a preferred embodiment, the recovered monomer coming overhead from the distillation column, is conveyed back to the polymerization reactor. Alternatively, the recovered monomer stream can be conveyed to a ethylene/ethane splitter or to the light ends section of an ethylene plant to recover the contained monomers.

In another preferred embodiment, the absorption solvent consists essentially of heavy hydrocarbons and/or the least volatile monomers, that are derived from the reactor vent gas stream; in this case, no external solvent is used.

In still another embodiment, preferred for reactor vent gas stream(s) that contain heavy comonomers, the reactor vent gas streams from the reactor are compressed and cooled. Some of the heavy components condense in the coolers and are separated from the reactor vent gas stream(s). The condensate is conveyed to the reactor or alternatively to an appropriate point in the light ends section of an ethylene unit.

Preferentially, absorption zone bottoms stream is reboiled and, optionally, interreboiled in a stripping zone to strip methane and hydrogen out of the absorber bottoms stream.

Also, optionally, the absorption solvent is intercooled at one or more points in the absorption zone to improve absorption efficiency.

Other significant aspects of the process of the present invention include the techniques for controlling inventory and composition of the absorption solvent.

The process of the present invention recovers ethylene, comonomers and solvents at a cost that is competitive with the cost of purchased ethylene and comonomers. Moreover, the process flexibly adapts to variations in the rate and composition of polyolefin vent gas streams. Accordingly, the process offers a practical, operable and cost-effective technology for recovering and recycling ethylene, comonomers and solvents that are currently wasted.

These and other features, aspects and advantages of the present invention are better understood with regard to the following description, appended claims, and accompanying drawings.

BRIEF DESCRIPTION OF THE DRAWINGS

In the interest of clarity, certain pumps, heat exchangers, control valves, control systems, and auxiliary equipment items that are necessary for the practical and safe operation of the unit but are not necessary to illuminate the inventive concepts have intentionally been left out of the drawing. Engineers and operators skilled in process technology will generally understand that the deleted equipment is included in practical and safe operating units. Accordingly, the deletions do not limit the scope of the invention.

DETAILED DESCRIPTION OF THE PREFERRED EMBODIMENTS

Process and catalyst technology for producing olefin polymers using gas phase reactor technology is amply disclosed and discussed in the patent literature and will not be discussed in detail herein except where it impacts the process of the present invention. A comprehensive survey of the technology can be found in U.S. Pat. No. 4,302,566 to Karol et al.; U.S. Pat. No. 4,011,382 to Levine et al.; U.S. Pat. No. 4,482,687 to Noshay et al.; U.S. Pat. No. 5,208,109 to Bailly et al.; U.S. Pat. No. 4,481,301 to Nowlin et al.; and U.S. Pat. No. 5,332,793 to Cann.

Among the polymers which may be produced using gas phase reactors and Ziegler-Natta catalysts are homopolymers of ethylene and propylene, copolymers of ethylene and one or more C3 to C8 alpha-olefin comonomers. Preferably, the higher alpha-olefin should not contain branching on any of the carbon atoms which are closer to the double bond than the fourth carbon atom. The preferred C2 to C8 alpha-olefins are ethylene, propylene, butene-1, pentene-1, hexene-1, 4-methyl pentene-1 and octene-1.

The ethylene copolymers have a density in the range of from about 0.91 to 0.94 g/cc. The density of the ethylene copolymer is determined by the amount of the alpha olefin comonomer which is copolymerized with the ethylene. Increasing comonomer content reduces product density. HDPE polymers having a density of greater than about 0.96 g/cc are produced by polymerizing ethylene in the absence of a comonomer. The amount of comonomers needed to achieve a specified density decreases with increasing molecular weight of the comonomer. Larger molar amounts of the comonomer would be needed in the order of C3<C4<C5<C6<C7<C8 to produce a specified density.

The gas phase polymerization reactions are done at a moderate pressure and temperature using a Ziegler-Natta type of catalyst. Ziegler-Natta catalysts are produced by combining a compound of a transition metal belonging to Group IV, V or VI of the Periodic Table of Elements and a cocatalyst/activator which is an organo-metallic compound of a metal of Groups I to III of the Periodic Table. The two components are typically fed to the reactor separately and combined in the reactor. One typical Ziegler-Natta catalyst system used commercially to produce LLDPE is a complex of terahydrofuran, magnesium chloride and titanium chloride reduced with diethyl aluminum chloride (0.4 diethyl aluminum chloride-to-terahydrofuran molar ratio) and tri-n-hexyl aluminum (0.4 molar ratio) impregnated on triethyl aluminum treated silica dioxide. The cocatalyst activator is triethylaluminum.

New gas phase olefin catalyst systems are emerging that are being heralded as a major leap in polymer science that will revolutionize plastic and elastomer resin production and markets. These new catalysts are termed "single-site metallocene" (SSM) catalysts. Single-site metallocene catalysts are group IV transition metals, such as titanium, hafnium or zirconium covalently bonded to a monocyclopentadienyl group bridged with a heteroatom such as nitrogen.

SSM catalysts allow unprecedented control over reactivity and can enhance existing products and create polymers with distinctive new properties and processing advantages. The components are connected in such a way that a constrained cyclic structure is formed with the titanium center. The bond angle between the monocyclopentadienyl group, titanium center, and heteroatom in SSM catalysts is less than 115 degrees. The arrangement opens up the titanium center facilitating the copolymerization of monomers and comonomers more easily including higher alpha-olefins. An indication of the ease with which SSM catalysts insert comonomers into ethylene copolymers is that SSM catalysts can copolymerize up to 30 times more 1-octene than Ziegler-Natta catalysts can. Strong Lewis acids such as methyl aluminoxane activate the catalyst to a highly efficient cationic form.

The key characteristic of SSM catalysts is that the polymerization sites on the catalyst are identically homogeneous so that the copolymers produced have narrow molecular weight distribution and narrow comonomer short chain branching distribution. Ziegler-Natta catalysts have multiple active sites which exhibit different reactivity ratios for ethylene and comonomers, thus forming polymers with broader molecular weight distribution and short-chain branching distribution. The resulting narrow distributions improve the toughness, optics and processing characteristics of plastic resins and expand the capability of the process to make new products including elastomers and plastic-elastomer hybrids.

SSM catalysts can copolymerize more and a wider range of alpha olefins than Ziegler-Natta catalysts to create a wide range of new copolymers. Ethylene copolymers with up to 30% alpha olefins have been reported which combine the properties of a plastic and an elastic. Moreover, SSM catalysts can copolymerize comonomers once thought incompatible with ethylene such as styrene to form new polymers with new properties. Also vinyl-ended polymer chains can be incorporated to produce long chain branching to improve processibility.

Because of the SSM catalyst's versatility, gas phase SSM units will produce a wide range of products in blocked operation. Reactor feeds vary over a wider range of compositions than with Ziegler-Natta catalysts; the units will have to be extremely flexible and adaptable to change.

Both Ziegler-Natta and SSM catalysts are introduced into the fluidized bed reactor impregnated into an inert solid particulate substrate such as silica, alumina or in a polyethylene prepolymer. The catalyst powder is carried into the reactor entrained in an inert gas such as nitrogen. The co-catalyst/activator is fed to the reactor dissolved in an inert solvent such as hexane.

The catalyst/polymer powder granules are fluidized by a gas stream that contains the monomers that are undergoing polymerization. In addition to the monomers, the reactor gas also contains nitrogen (or other inert gas) and typically a small amount of hydrogen to control the molecular weight of the polymer. The polymerization occurs on the surface of the catalyst bearing particles causing the particles to grow in size. The monomer conversion per pass through the reactor ranges from about 10% for ethylene up to about 90% for the higher alpha olefin comonomers. The gas stream leaving the reactor contains the unreacted monomers. The gas stream is cooled and recycled back to the inlet of the reactor using a recycle compressor. Except for leakage and losses, the monomers are recycled to total conversion. Ethylene and comonomer are added to the reactor inlet stream to make up for the monomers that have been converted.

Catalyst productivity is very high. Generally, from about 100,000 to about 1,000,000 pounds of polyolefin are produced for every pound of transition metal in the catalyst (from about 4,000 to about 8,000 lbs. of LLDPE per lb. of total catalyst), so that the product does not have to be treated to remove residual catalyst ash.

The process of the present invention is generally applicable to any olefin polymer that is produced in a gas phase polymerization reactor, including polyethylene, polyethylene/alpha-olefin copolymers, polypropylene, ethylene/propylene elastomers, and particularly to LLDPE and HDPE. For convenience, the description which follows is written for LLDPE. LLDPE is the most important of the commercial polyolefins produced using gas phase technology and LLDPE production and moreover is representative of the other embodiments of the process. Accordingly, the present invention is not to be construed to be limited to production of LLDPE.

The copolymerization is done at relatively low total reactor pressure in the range from about 100 to about 350 psig and at relatively low monomer partial pressures in the gas phase in the range of about 25 to about 150 psia. The difference between the monomer partial pressures and the total pressure in the reactor gas is made up with nitrogen or other inert material.

Industrial gas phase olefin polymerization reactors are predominantly fluidized bed reactors. However, the present invention is applicable also to other types of solid/gas phase reactors including mechanically agitated or kiln type solid/gas reactors or any type of reactor which provides effective contact between the reactor gas and solid catalyst/polymer particles in the reaction zone.

A fluid-bed reactor may be operated at a pressure of up to about 1,000 psig, and for LLDPE resin production is preferably operated at a pressure of from about 100 psig to about 350 psig. Higher pressures favor heat removal since an increase in pressure increases the heat capacity of the gas.

Figure 1:
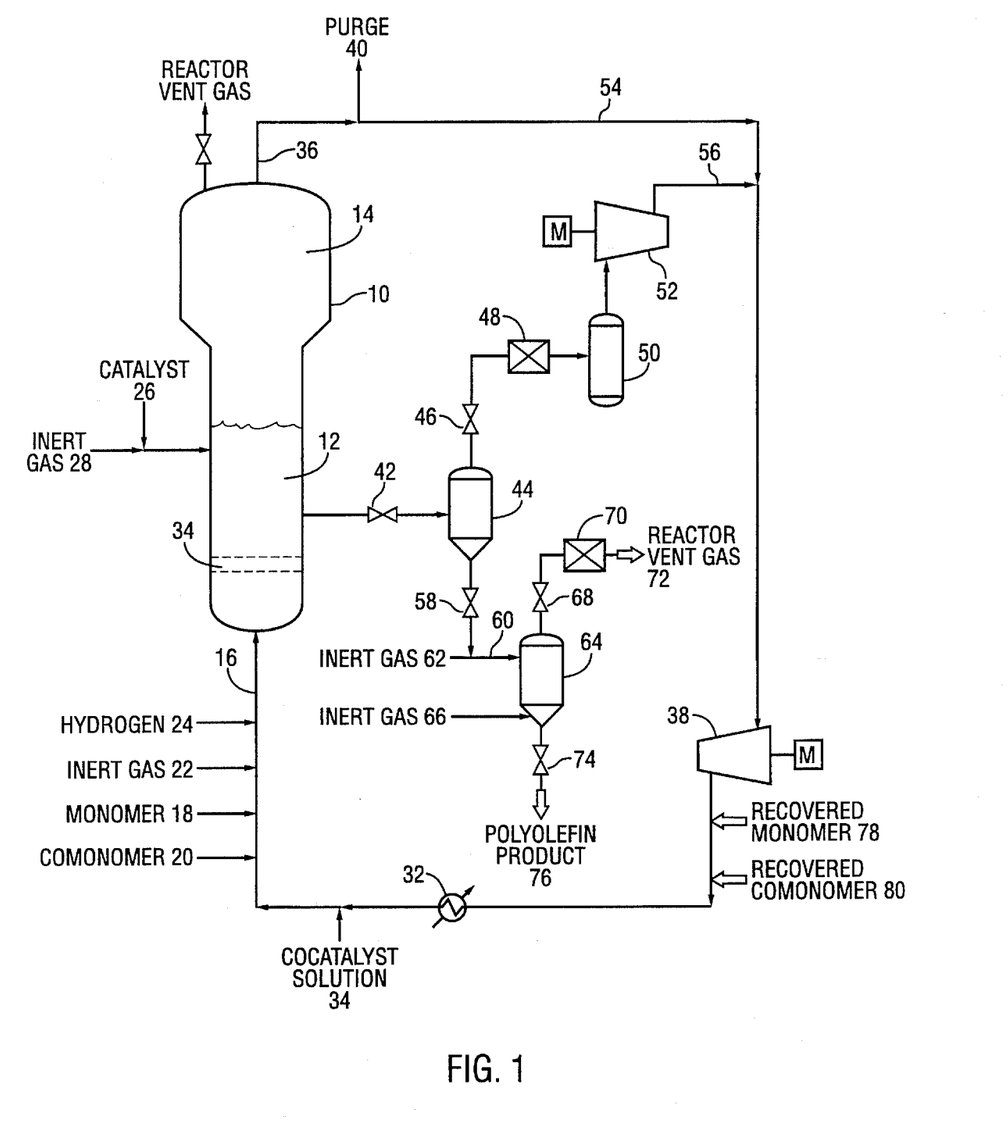
FIG. 1 is a simplified process flow diagram of the reactor section of a typical gas phase fluidized bed reactor olefin polymerization unit. Reactor vent gas streams produced in the polymerization unit are the feed gas streams to the absorption unit wherein monomers and solvents are recovered and recycled back into the reactor.

Referring to FIG. 1, the reactor 10 typically consists of a reaction zone 12 and a deentrainment zone 14. The height to diameter ratio of the reaction zone is typically in the range of about 2:1 to about 5:1. The diameter of the deentrainment zone is larger than the diameter of the reaction zone to reduce the superficial linear velocity of the reactor gas in the deentrainment zone. This induces reactor polymer particles entrained in the gas leaving the fluidized bed reaction zone to disengage from the reactor gas and fall back into the bed.

Ethylene copolymers made in gas phase fluid-bed reactors form as a fine granular powder which has a settled bulk density of between about 15 to 32 pounds per cubic foot and an average particle size of the order of about 0.005 to about 0.06 inches. Catalyst particles are typically carried into the reactor entrained in an inert charge gas such as nitrogen. (U.S. Pat. No. 5,317,036 discloses a unsupported soluble transition metal coordination catalysts that is fed into the reactor dissolved in a suitable inert diluent such as hexane.)

The reaction zone 12 contains a fluidized bed of growing polymer particles, formed polymer particles, and a minor amount of newly-introduced catalyst particles, all fluidized by the continuous flow of reactor gas that contains the polymerizable monomers and nitrogen. The fluidized bed has the general appearance of a dense mass of individually moving percolating particles. The pressure drop across the bed is equal to or slightly greater than the weight of the bed divided by the cross-sectional area. To maintain a viable fluidized bed, the superficial gas velocity through the bed must exceed the minimum flow required for fluidization, and preferably is at least 0.2 ft/sec above minimum flow. The critical superficial gas velocity is typically in the range from about 1.2 to 3.0 ft/sec.

The reactor outlet gas stream 36 is compressed in a recycle gas compressor 38, typically a centrifugal or an axial compressor, and then passed through a recycle gas cooler 32, typically a conventional shell and tube heat exchanger, which cools the gas stream to remove the heat of polymerization absorbed by the gas stream in the reactor. Monomers are consumed by the polymerization reaction in the fluidized bed 12 and components are lost in the reactor product stream through valve 42. The composition of the reactor gas inlet stream 16 is continually monitored by a gas analyzer (not shown), typically a gas chromatograph. Streams of monomer, ethylene, 18, comonomer 20, inert gas, nitrogen, 22, and hydrogen 24 are injected into the recycle gas stream 54 to makeup components converted in the reactor or lost in the product stream 42 to maintain the composition of the reactor gas stream at the reactor inlet 16 at a specified steady state. The concentration of monomers in the reactor inlet gas stream 16 is typically maintained in the range of from about 20 to about 60 mol %. The balance of the reactor inlet gas stream 16 is made up with nitrogen or other catalytically inert gas. Paraffin impurities that are usually present in the makeup ethylene and alpha olefin comonomer streams such as ethane, butane or hexane also appear in the reactor gas inlet stream 16.

Hydrogen is added to the reactor gas to control melt index, via chain transfer reactions. Hydrogen 24 is fed into the reactor feed gas to act as a chain transfer agent to control molecular weight (melt index) of the product resin. The concentration of hydrogen in the reactor feed is typically in the range of from about 0 to about 2.0 moles of hydrogen per mole of monomer. U.S. Pat. No. 4,532,311 discloses techniques for controlling the concentration of hydrogen in the recycle gas stream to repress formation of sheets of polymer in the reactor which disrupt fluidization.

The inert granular solid substrate containing the impregnated catalyst is continuously carried into the reactor through conduit 26 in a stream of nitrogen gas or other inert gas 28 at a point in the bed where there is good mixing of polymer particles to preclude inducing "hot spots" in the fluidized bed. The catalyst is preferably fed into the reactor at a point 20 to 40 percent of the reactor diameter away from the reactor wall and at a height of about 5 to about 30 percent of the height of the bed. U.S. Pat. No. 3,779,712 discloses a preferred catalyst injection devise.

The cocatalyst/activator is preferably added to the reaction system as a solution in a catalytically inert hydrocarbon. The cocatalyst stream is usually injected into the reactor recycle gas stream 54 downstream from the recycle gas cooler 32, through conduit 34 as shown on FIG. 1. Preferred cocatalyst/activator diluents include butane, pentane and hexane. Cocatalyst solvent is present in the reactor outlet gas stream 36 and the reactor recycle gas stream 16. In accordance with one embodiment of the process of this invention, the cocatalyst/activator solvent is selected so that it is less volatile than the heaviest alpha olefin comonomer to facilitate recovery of the comonomer from reactor vent gas in the Mehra absorption unit.

The ratio of recycle gas flow rate to makeup monomer flow rates must be sufficiently high so that the minimum fluidization superficial velocity is exceeded. Also, the mass flow of reactor gas through the bed must be sufficiently high to absorb the heat of polymerization without excessively raising the gas temperature. The recycle rate is typically in the order of 50 times the monomer makeup rate to meet these dual requirements.

The fluidized bed 12 contains growing and formed particulate polymer particles, as well as catalyst particles. The polymer particles are hot and chemically active so they must be prevented from settling to avoid forming polymer sheets which would interfere with fluidization. Accordingly, the incoming reactor gas stream must be uniformly distributed into the bottom of the bed. Typically, the reactor feed gas is fed into the reactor below a gas distribution plate 34 in the bottom of the reactor which uniformly distributes the gas into the fluidized bed 12. The gas distribution plate may be a screen, slotted plate, perforated plate, bubble-cap type and the like. The elements of the plate may all be stationary, or the plate may be of the mobile type disclosed in U.S. Pat. No. 3,298,792.

The temperature of the reactor inlet gas 16, which is typically in the range of from about 120° F. to 140° F., increases in the first 6 to 12 inches above the gas distributor 34 to the temperature in the fluidized bed reaction zone 12, which is typically in the range of about 175° F. to 195° F. The increase in gas temperature results from absorption of the heat of polymerization released in the fluidized bed. Fluidization maintains the bed at essentially uniform temperature.

It is essential to operate the fluid-bed reactor at a temperature below the sintering temperature of the polymer being produced to ensure that particle sintering will not occur. The sintering temperature is a function of the density of the resin being produced. In general, LLDPE resins, have a low sintering temperature, 165° F. to about 205° F., whereas HDPE resins have a higher sintering temperature of from about 210° F. to about 240° F.

The reactor gas flows out of the fluidized bed 12, through the velocity reduction zone 14 where entrained bed particles fall back into the fluidized bed and then flows out the top of the reactor as stream 36.

Until 1985, it had been the conventional wisdom among polyolefin operators that gas phase olefin polymerization fluidized beds could not tolerate more than a trace of liquid in the recycle gas stream without polymer plugs forming in the fluidized bed that destabilized fluidization. U.S. Pat. Nos. 4,543,399 and 4,588,790 disclose, however, that fluidization reactors can be smoothly fluidized with as much as 20 percent by weight, preferably up to about 10 percent liquid. U.S. Pat. No. 5,266,276 discloses techniques for further increasing the heat removal capacity of the reactor system by adding a readily volatile liquid hydrocarbon into the recycle reactor gas. Preferably, the liquid hydrocarbon can be selected from among alkanes with from 2 to 7 carbon atoms or their mixtures, in particular n-butane, isobutane, n-pentane, isopentane and n-hexane. Note that these hydrocarbons are also among the preferred Mehra lean solvents.

This is an important development because heat removal capacity increases by approximately 40% with only 10% liquid in the recycle gas. It turns out that the reactor feed gas dewpoint limitation that had been broadly adhered to had been unduly limiting and restrictive. Relaxing the liquid content restriction of the gas feed stream opens the way to increase the space time yield of polyolefin production in fluidized bed reactors by utilizing latent heat of vaporization of liquid in the recycle gas to absorb reaction heat as well as sensible heat. The liquid phase is produced by cooling the recycle gas below its dewpoint in the recycle gas cooler heat exchangers. The cooling capacity of the recycle stream is increased both due to the greater temperature differential between the entering recycle gas stream and the reactor and by the vaporization of the condensed liquid entrained in the recycle stream.

The polymerization rate is directly proportional and sensitive to the catalyst addition rate. Accordingly, variations in the rate of catalyst injection will change the reaction rate and hence the rate of release of the heat of reaction. Typically, the temperature of the reactor inlet gas stream 16 is controlled at a specified temperature using the recycle gas cooler 32. The control logic is to continually adjust the catalyst feed rate to maintain the specified temperature in the fluidized reactor bed. This control mode is accomplished using conventional process control instrumentation.

Ziegler-Natta catalysts produce trace amounts of C8+ oligomers and fouling of the reactor recycle gas distribution plate by oligomers has been observed. To keep fouling in check, the usual practice is to continually remove a small purge stream 40 from the recycle gas to prevent build-up of oligomers in the recycle gas.

The fluidized bed 12 is maintained at a constant height by discharging polymer from the fluidized bed at the rate at which the particulate polymer product is formed in the reactor. There are numerous ways known to the art to accomplish this. A preferred system for discharging product from the reactor, first disclosed by Bobst et al. in U.S. Pat. No. 4,372,758, is shown in FIG. 1. The polymer powder is carried by a stream of reactor gas through valve 42 into the product discharge tank 44 which is maintained at a pressure lower than in the reactor. Most of the reactor gas is separated from the product particles in the product discharge tank 44. The separated reactor gas flows out of the top of the product discharge tank 44, through valve 46, filter 48 to trap fine polymer particles. The separated product gas then flows into surge tank 50 to smooth variations of flow rate, and into the suction of a product gas compressor 52 which pumps the reactor gas into reactor gas recycle line 54 through conduit 56. The recycle line 54 conveys the recovered product gas back into the reactor 10.

The product polymer powder flows out of the bottom of the product discharge tank 44 through a valve 58 into a product purge tank 64. Typically, the polymer product powder is discharged from the product discharge tank outlet valve 58 into a conduit 60 where it is entrained in a stream of nitrogen or other suitable inert gas 62 that carries the product powder into the top of the product purge tank 64.

In typical operation, valve 42 is open and valves 46 and 58 are closed. Product and reactor gas enter the product discharge tank 44. Valve 42 closes and the product settles in the product discharge tank. Valve 46 is then opened permitting reactor gas to flow from product discharge tank to surge tank from which it is continually compressed back into recycle line 54 at point 56. Valve 46 is then closed and valve 58 is opened. Product flows from the product discharge tank 44 through valve 58 to the product purge tank 64, typically carried in stream of nitrogen or other inert gas 62. Valve 58 is then closed. The valve timing sequence is accomplished using a conventional programmable controller.

A stream of nitrogen or other suitable inert gas 66 is continuously injected into the bottom of the product purge tank 64 and distributed so as to flow in near uniform plug flow up through the product polymer powder in the product purge tank 64. The nitrogen stream 66 promotes desorption of ethylene, comonomers and heavy hydrocarbons dissolved in the product polymer powder and sweeps entrained reactor gas out of the reactor product. The diffusion rate of reactor gases out of the product polymer increases with increasing polymer temperature. However, LLDPE resins soften and stick at temperatures in the range of from about 210° F. to 230° F. which is close to reactor temperature. Consequently, the usual practice is not to heat the reactor product powder to promote purging.

For typical LLDPE products, a residence time of about an hour is sufficient to purge the reactor product free of reactor gases to a safe and environmentally acceptable level. Typically, the purge nitrogen stream flow velocity through the product bed in the product purge tank is greater than about one linear foot per minute. Of course, air must be excluded from the product purge tank to preclude forming explosive gas mixtures in the tank. Safety concerns dictate that a positive pressure of at least several psi must be maintained in the product purge tank and instrumentation provided to preclude inadvertently drawing a vacuum in the system.

Figure 2:
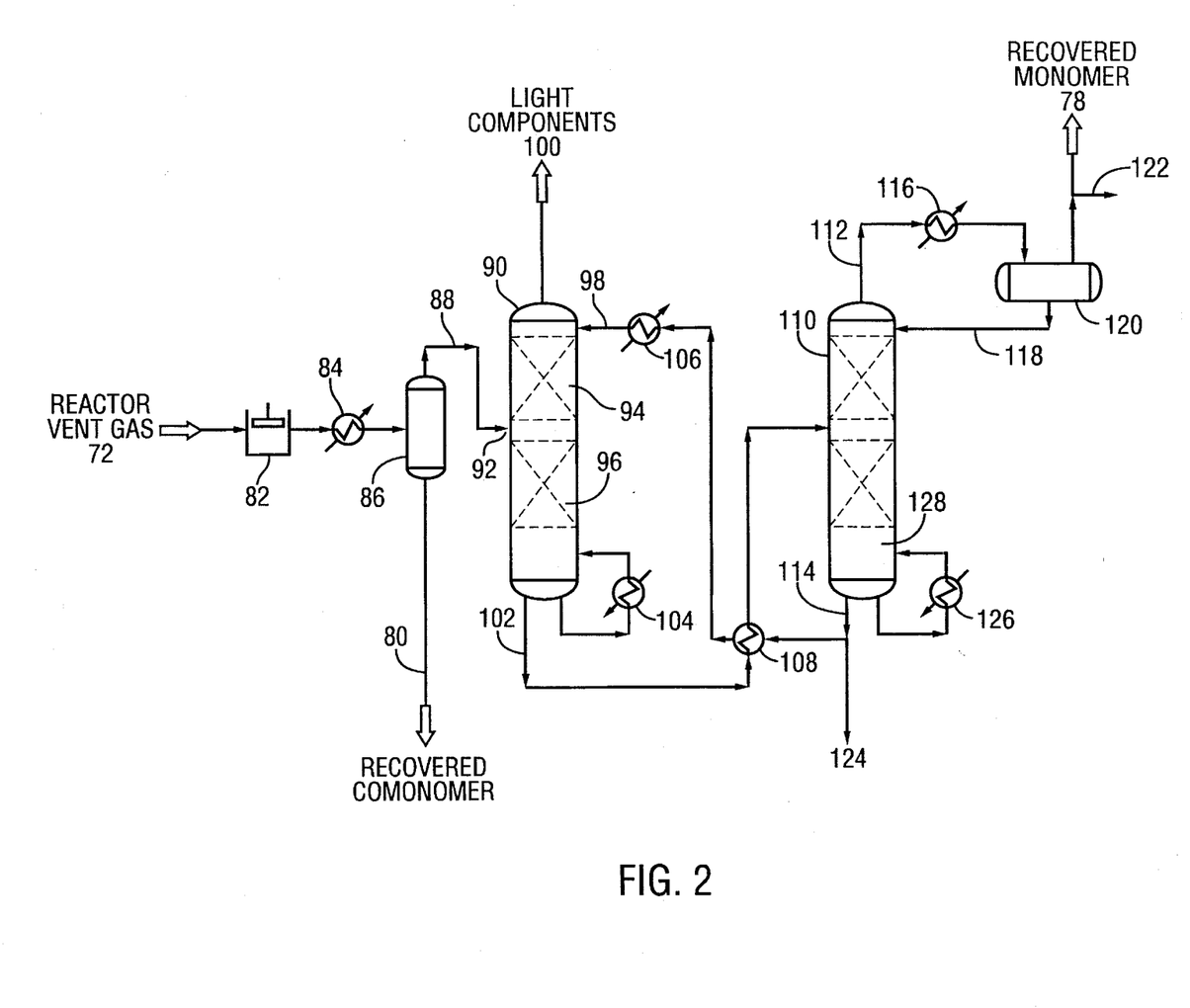
FIG. 2 is a simplified process flow diagram of a Mehra absorption unit that recovers monomers and solvents from the reactor vent gas stream.

The reactor vent gas stream 72 in FIG. 1 is the feed gas stream to the absorption recovery unit of the process of this invention in FIG. 2. The reactor vent gas stream 72 flows out of the top of the product purge tank 64, through a valve 68 and passes through a filter 70 to remove and recover fine polymer particles entrained in the vent gas stream. The reactor vent gas stream 72 is typically comprised of from about 15% to about 35% ethylene, about 1% to about 5% comonomer, 2 to 5% hydrogen, 2 to 5% cocatalyst solvent with the remainder nitrogen, all by weight.

The product polymer powder 76, stripped free of reactor gases, flows out of the bottom of the product purge tank through a valve 74 and is conveyed to product storage.

Bobst et at., in the '758 patent, disclose an alternative embodiment to their process in which part of the reactor vent gas from the product purge tank is used as the carrier gas that conveys product powder from the product discharge tank to the product purge tank.

U.S. Pat. No. 4,666,998 to Haggerty discloses still another alternative purge drum venting system in which the reactor vent gas coming overhead from the product purge tank is pumped into the reactor. The vent gas stream required to purge nitrogen and other light gases that enter the system are purged in a vent gas stream taken from the top of the reactor. Part of the vent gas from compressor discharge is the carrier gas used to convey the product powder from the product discharge tank to the product purge tank.

European Patent Application 0 071 430 discloses still another system for discharging polymer product from the fluidized bed reactor which utilizes two or more parallel trains of tanks, each train including a product discharge tank and a product purge tank in series. The reactor product stream is withdrawn from the reactor near the bottom of the bed into a first product discharge tank where the reactor gas is separated from the reactor product and is conveyed back into the reactor near the top of the fluidized bed. The pressure difference between the bottom and top of the fluidized bed is sufficient to convey the separated reactor gas back to the reactor without a blower or compressor. Reactor product accumulates in the first product surge tank until the tank falls with polymer. Then the reactor product discharge stream is diverted to the second product discharge tank and the product in the first product discharge tank is conveyed to the first product purge tank. Product discharge into the second product discharge tank is continued until it is full of product polymer powder and then the reactor discharge stream is diverted to the first product discharge tank. This process is repeated cycling between the two parallel discharge trains.

U.S. Pat. No. 4,820,463 to Raufast and U.S. Pat. No. 4,340,701 to Willmore et al. disclose a process wherein the purge tank is replaced by a mechanically agitated degasser. The mechanical degasser subjects the reactor product resin powder to vigorous agitation which raises the temperature of the powder to between from about 175° F. to about 250° F., which is well into the sintering range of the product. A stream of nitrogen or other inert gas is passed through the mechanical degasset to sweep the monomers released by the product resin polymer out of the system.

U.S. Pat. No. 5,376,742 to Krause discloses a process wherein part of the purge gas fed into the bottom of the product purge tank and the gas used to convey product from the product discharge tank to the product purge tank are slipstreams taken from the reactor recycle gas stream coming from the top of the reactor. The slipstream is cooled in a heat exchanger against a refrigerant cooling medium to condense the less volatile comonomers and solvents. The condensate is separated from the recycle gas slip stream. Accordingly, the cooled reactor recycle slipstream that is fed into the purge tank to purge reactor gases out of the product consists essentially of nitrogen, ethylene and hydrogen and contains essentially no heavy comonomer e.g., butene or hexene. The inventor asserts that the absence of the less volatile comonomers and solvents in the purge gas promotes degassing of reactor gases from the product. The overhead gas stream from the product purge drum is recycled to the reactor. The purge gas stream exits from the top of the product purge tank.

Whichever product purge design is selected, it is inescapable that one or more vent gas streams comprised of unreacted monomers and the inert purge gas will be emitted from the reaction section and these streams are the inlet streams to the absorption monomer recovery section of the process of this invention in accordance with the present invention.

The vent gas absorption section of the process of this invention treats the vent gas streams from the reactor section to recover monomers and solvents contained in the vent gas streams. Reactor vent gas streams typically contain nitrogen or other inert gas, hydrogen, ethylene, higher alpha olefin comonomers. Reactor vent gas streams also contain heavier hydrocarbons including the cocatalyst solvent, and any condensable hydrocarbons added to the reactor feed to enhance heat removal in the reactor. The composition of reactor vent gas streams vary over a wide range depending on the design of the reactor system and the product grade being produced. The most commonly encountered reactor vent gas streams are the purge gas streams from the product purge tank such as stream 72.

As previously discussed, alternative reactor section designs can produce reactor vent gas streams from other sources in the reactor system. Clearly, any reactor vent gas stream comprising an inert or non-condensible gas containing monomers and/or solvents can be processed in the absorption unit to recover monomers and solvents. For example, fluidized bed reactors usually have top vent system to vent reactor gas during startups, shutdowns and upsets; these top vent streams can be treated in the reactor vent absorption unit of this invention to recover contained monomers.

The vent gas absorption unit produces one or more recovered monomer streams which contain the monomer, comonomers and solvents recovered from the vent gas. These streams can be conveyed into the reactor recycle gas line for recycle back to the reactor. Alternatively, the streams can be conveyed to the appropriate points in the light ends section of an ethylene unit or to an ethylene splitter tower for recovery. In FIG. 1, the recovered monomer and comonomer streams are recycled to the reactor in conduits 78 and 80, respectively.

The vent gas absorption unit also produces a stream of nitrogen, hydrogen and other light components that are rejected from the vent gas. This stream is usually purged, typically by burning the stream in a flare stack but part of the light components stream can be recycled back to the reactor or used as purge gas in the product purge tank 64 or as transfer gas 62 for conveying product polymer powder from the product discharge tank to the product purge tank.

FIG. 2 is a simplified process flow diagram of a vent gas absorption unit in accordance with the process of this invention. The reactor vent gas stream 72 is the feed stream to the vent gas absorption unit. Reactor vent gas stream 72 is compressed in vent gas compressor 82. The vent gas compressor can be a centrifugal compressor but typically a multi-stage reciprocating compressor equipped with interstage cooling is used for the service. The compressed vent gas stream is cooled in vent gas cooler 84 which is typically a train of vent gas coolers in series and/or in parallel. Typically, the lead vent gas cooler is cooled with cooling water or ambient air, the intermediate cooler is cooled by the overhead stream 100 from the absorber stripper 90 as the stream leaves the process, and the downstream cooler is cooled with an appropriate refrigerant. As the compressed vent gas is cooled, heavy comonomers and other hydrocarbons in the vent gas condense. The reactor vent gas condensate is separated from the reactor vent gas in a reactor vent gas separator 86. The condensate, which is rich in comonomer, is conveyed into the reactor recycle line 54 of FIG. 1 using conduit 80. Since the pressure of the condensed stream is typically higher than the reactor pressure, the point in the reactor recycle loop at which the condensate stream is added can be either upstream or downstream of the recycle gas compressor 38.

The overhead gas stream 88 from the vent gas separator 86 is conveyed into the absorber stripper 90 at a suitable point 92 in the midsection of the tower and flows up the column. The section of the absorber stripper above the feed point 92 is termed the "absorption section" 94, and the section below the feed point is termed the "stripping section" 96. An absorption solvent stream 98 is pumped into the top of the absorber stripper and flows down the absorption section 94 countercurrently contacting the rising gas stream, absorbing ethylene, higher alpha olefin comonomers, and heavier hydrocarbons out of the reactor vent gas stream.

The absorber stripper overhead gas stream 100 contains most of the nitrogen, hydrogen and light gases that came into the absorber stripper with the reactor vent gas stream 88. The absorber stripper overhead gas stream 100 is typically burned in a flare stack but part of the stream can be used as the inert gas stream 66 to the product purge tank 64 shown in FIG. 1 or as inert product transfer gas stream 62 to convey product powder from the product discharge tank 44 to the product purge tank 64 shown in FIG. 1.

Optionally, one or more sidestreams of solvent can be removed from the absorption section (not shown in FIG. 2). The sidestreams are cooled in intercoolers and injected back into the absorption section at points below the points where they were withdrawn. Intercooling mitigates the temperature rise of the solvent that occurs as heat of absorption is released by ethylene and higher hydrocarbons condensing into the solvent. Intercooling improves the absorption effectiveness of the tower because the capacity for absorption of the lean solvent increases with decreasing solvent temperature.

Solvent flows down the absorption section 94 and into and down the stripping section 96. The absorber stripper bottoms stream 102 is comprised of absorption solvent and ethylene, comonomers and heavy hydrocarbons that were absorbed by the absorption solvent in the absorption section. The solvent stream descending into the stripping section 96 from the absorption section 94 unavoidably contains some nitrogen, hydrogen and light components that were absorbed from the feed in the absorption section 94. Light components left in the absorber stripper bottoms stream remain in the recovered monomer stream and are ultimately recycled back to the reactor. Preferentially, light components are stripped out of absorber stripper bottoms stream in the stripping section 96 by reboiling absorber stripper with a reboiler 104. The reboiler 104 vaporizes part of the absorber stripper bottoms stream. The vaporized stream is conveyed into the bottom of the absorber stripper 90 and rises up the stripping section 96 countercurrently contacting the descending absorption solvent, thereby stripping light components out of the absorption solvent.

Optionally, in addition to the reboiler, one or more solvent sidestreams (not shown in FIG. 2) can be drawn from the stripping section and vaporized in interreboilers to produce additional stripping gas which is fed into the absorber stripper points above the points where the solvent was withdrawn.

The temperature in the absorption section 94 is advantageously maintained in the range of from about 30° F. to about −60° F. and preferably in the range of from about −10° F. to about −50° F. Lower temperatures reduce monomer and solvent losses in the overhead gas stream but refrigeration power cost increases with decreasing temperature. Temperature in the absorption section 94 is reduced by cooling the absorption solvent 98 entering the absorber stripper in a solvent cooler 106 by heat exchange against an appropriate refrigerant such as propane or propylene. As previously discussed, the temperature rise in the absorption section may be mitigated by using an intercooler.

Pressure in absorber stripper is maintained in the range from about 75 psia to about 600 psia, preferably between about 150 psia and about 450 psia by controlling the back pressure of the overhead gas stream leaving from the top of the absorber stripper, using a back pressure regulating control valve. The solvent recirculation rate required to absorb the monomers from the reactor vent gas stream decreases as pressure is increased.

It is important to cost effectively minimize the amount of monomer and absorption solvent lost in the absorber stripper overhead gas stream both to increase monomer recovery and preclude depletion of solvent from the system. Measures which can be taken in the design phase that improve absorption of ethylene include providing more mass transfer stages—more mass transfer surface area and height, higher efficiency packing or trays, and adding intercoolers to the absorption section. Operating measures that can be taken to increase monomer absorption include increasing solvent circulation rate relative to gas feed rate, reducing the temperature of the solvent stream going to the tower and reducing the temperature of intercooled solvent.

Additionally, energy, monomers and solvents contained in the absorber stripper overhead gas stream can be recovered by isentropically expanding the stream in a gas expander. The expander can be conveniently coupled to the vent gas compressor so the shaft work extracted from the expanding gas stream drives the vent gas compressor. The temperature of the gas stream drops sharply as the gas stream expands isentropically across the expander causing monomers and other hydrocarbons in the absorber overhead gas stream to condense. The condensate is separated from the gas stream and added back to one of the process streams at a convenient point. Alternatively, instead of using an expander, the absorber stripper overhead gas stream can be cooled by expansion across a pressure let down valve via the Joule-Thomson effect. However, no shaft work is recovered with a pressure let down valve. Condensation of monomers and other hydrocarbons can be enhanced by cooling the absorber stripper overhead gas stream in a refrigerated cooler prior to expansion.

These measures raise investment and operating costs, so there is an economic trade-off between minimizing overhead monomer and heavy hydrocarbon losses and controlling costs which is amenable to optimization.

The absorber stripper tower can be packed with an appropriate mass transfer packing material such as but not limited to Raschig or saddle rings. Alternatively, the absorber stripper can be equipped with appropriate distillation trays such as but not limited to bubble cap, sieve tray, valve or multi-downcomer trays.

The absorber stripper bottoms stream 102, which comprises absorption solvent containing absorbed ethylene, comonomers and heavy hydrocarbons from the reactor vent gas stream 88, is conveyed to a monomer distillation column 110 which fractionates the stream into a monomer distillation column overhead stream 112 containing the ethylene, comonomer and solvents that have been absorbed out of the reactor vent gas stream in the absorber stripper 90, and a bottoms stream 114 that is comprised of heavy hydrocarbons. Optionally, the absorber stripper bottoms stream 102 on its way to the monomer distillation column 110, may be heated in a heat exchanger 108 against the hot monomer distillation column bottoms stream 114 to conserve energy.

The monomer distillation column overhead gas stream 112 is condensed in an overhead condenser 116, which can be a partial or a total condenser. If the overhead condenser 116 is a total condenser, part of the condensate is fed back into the top of the monomer distillation column as reflux for the column and part of the condensate is taken off as the recovered monomer stream 78 that is conveyed into the reactor recycle gas line 54 shown in FIG. 1. If, as shown in FIG. 2, the monomer distillation column overhead condenser 116 is a partial condenser, then the condensate is separated from the vapor in a separation drum 120; the condensate is fed back into the top of the monomer distillation column as the reflux stream 118, and the vapor stream 78 is the recovered monomer stream that is conveyed to the reactor recycle line 54 of FIG. 1 for recycle to the reactor. Typically, the pressure in the monomer distillation column is higher than the reactor pressure, so the recovered monomer stream 78 can be added to the reactor recycle gas line at a point downstream of the recycle gas compressor 38. Typically, a "lights" purge-stream 122 is withdrawn from the top of the reflux drum or other convenient high point in the monomer distillation column overhead system to purge non-condensible gases from the system.

The monomer distillation column bottoms stream 114 is the absorption solvent that is fed into the top of the absorber stripper 90 through conduit 98. The monomer distillation column bottoms stream 114 is comprised of heavy hydrocarbons from the reactor vent gas stream which includes cocatalyst solvent, inert condensibles added to the reactor to increase heat removal capacity in the reactor, and possibly butane, hexane, octane or other alkanes that are usually present as impurities in the makeup monomer streams that are fed to the reactor. Typically, the heavy hydrocarbons are comprised of C4 to C10 paraffins, olefins, aromatics or mixtures thereof and are therefore in the desirable C4 and C10 hydrocarbon range for absorption as taught by Mehra.

Typically, a small "heavies" purge stream 124 is withdrawn from the monomer distillation column bottoms stream to prevent buildup of oligomers and other very heavy components in the absorption solvent.

The monomer distillation column is typically of conventional design, including an overhead condenser and a reboiler, and its internals are typically distillation trays such as bubblecap or sieve trays but can also be a suitable mass transfer packing such as Raschig or saddle rings. Optionally (not shown in FIG. 2), the monomer distillation column can be equipped with one or more intercoolers and interreboilers.

The monomer distillation tower is conventionally reboiled by vaporizing a slip stream from the bottom of the monomer distillation column in a reboiler 126 and feeding the vapor into the bottom of the distillation column. The reboiler is typically a thermosyphon reboiler heated by steam or another suitable heating medium, but it can be any other suitable type of heat exchanger such as a multi-pass shell and tube heat exchanger.

Bottoms from the monomer distillation column are accumulated in an accumulation zone 128 in the bottom of the column or in a drum external to the column. The accumulation zone 128 serves as the storage reservoir for the heavy hydrocarbon solvent. The liquid level in the bottoms accumulation zone 128 is continually monitored to ensure that an adequate inventory of solvent is maintained.

If it is observed that the level in the accumulation zone 128 has fallen below set point level, it means that rate of flow of heavy components in streams leaving the absorption monomer recovery unit, principally in the recovered comonomer stream 80 condensed from the reactor vent gas stream 72 and the overhead stream from the monomer distillation column 78, exceeds the rate of flow of heavy components coming into the unit in the overhead gas stream 88 from the vent gas separator 86. Several adjustments can be made to increase absorption solvent inventory in the accumulation zone 128. Part of the recovered comonomer stream 80 can be conveyed to the accumulation zone 128. Or the exit temperatures from the vent gas condensers 84 can be increased to reduce the amount of heavy hydrocarbons condensed out of the reactor vent gas in stream 80. Alternatively, the monomer distillation column 110 reflux rate can be increased to drive more heavy components down the column and into the monomer distillation column bottoms stream 114. Alternatively or additionally, the reboil rate in the bottom of the monomer distillation column 110 can be reduced by decreasing the flow of heating medium to the reboiler 126, which reduces the amount of heavy hydrocarbons lost in distillation column overhead stream 78 and increases bottoms inventory in the accumulation zone 128.

If it is observed that the level of bottoms in the accumulation zone 128 exceeds the setpoint level, reverse adjustment to those described above can be taken.

While maintaining inventory of bottoms in the accumulation zone 128 in the specified range, it is also possible to independently adjust the average molecular weight of the monomer distillation column bottoms stream 114 within the range of molecular weights of the heavy components in the reactor vent gas stream 72 by adjusting the monomer distillation column reboil rate and the reflux rate. Increasing the reboil rate increases the average molecular weight of the bottoms stream 114 and decreasing the reboil rate decreases the molecular weight of the bottoms stream. Increasing the reflux rate decreases the average molecular weight of the bottoms stream 114 and reducing the reflux rate increases the average molecular weight of the bottoms stream.

The pressure in the monomer distillation column 110 is another independently controllable operating parameter. Preferably, the pressure in the monomer distillation column is set high enough so that the recovered monomer stream coming overhead from the column can be conveyed into the reactor without additional compression.

For a specified monomer distillation tower pressure, there is a unique correlation between the average molecular weight of the bottoms stream and the bottoms temperature. Accordingly, the average molecular weight of the bottoms stream can be conveniently monitored and controlled using bottoms temperature as a surrogate for the desired average molecular weight.

Optionally, the bottoms stream from the monomer distillation column 114 going to the absorber stripper 90 is cooled in a heat exchanger 108 against the absorber stripper bottoms stream 102 flowing from the absorber stripper 90 to the monomer distillation tower 110. The monomer distillation column bottoms stream 114 is cooled further by heat exchange against a refrigerant such as vaporizing propylene or propane in a solvent cooler 106. The cooled stream is fed into the top of the absorber stripper 90 through conduit 98 where it functions as the absorption solvent.

From the preceding discussion, it is now apparent that in preferred embodiments of the process of this invention, the absorption solvent is produced in the monomer distillation column as the bottoms stream from the monomer distillation column from heavy components in the reactor vent gas stream. In an alternate but less preferable embodiment of the present invention, an external solvent can be used as the absorption solvent. As taught by Mehra, the solvent is preferably selected from among hydrocarbons with 4 to 10 carbons and can include paraffins, olefins, naphthenes or aromatics. Specifically excluded are diolefins and acetylene because these compounds have propensity to oligomerize and concentrate in the towers and foul and plug the equipment. If an external solvent is used, facilities to receive, store and handle the external solvent are required and making up external solvent vented and leaked from the process adds additional cost.

Accordingly, the process of the present invention is a gas phase olefin polymerization process in which unreacted monomers, solvents and inert condensibles contained in reactor vent gas streams are recovered and recycled to the reactor or recovered in an appropriate monomer purification unit such as the light ends section of an ethylene unit or an ethylene/ethane splitter. Currently, reactor vent gas streams are burnt in flares because cryogenic processes are not sufficiently cost effective or flexible to process reactor vent gas streams. The present invention recovers unreacted monomers from reactor vent gas streams cost competitively, safely, and is sufficiently flexible and adaptable to cope with the wide ranging stream compositions and rates typical of gas phase polymerization units. Clearly, the cost of producing polyolefins is significantly reduced by the improvements encompassed in the process of the present invention.

EXAMPLES 1-3

Examples 1, 2 and 3 present flow rates, composition, pressure and temperature for the key streams in the absorption unit of the process of this invention operating with three different but typical reactor vent gas streams from gas phase olefin reactors. The stream numbers in the examples refer to FIG. 2: reactor vent gas 72, compressed vent gas 88, comonomer condensate 80, light components 100, recovered monomer(s) 78 and absorption solvent 98. The stream data are from heat and material balances computed using a commercial process simulation computer program widely used to design process plants.

The vent gas stream 72 in Example 1 is from a reactor producing an ethylene homopolymer so that vent gas contains no comonomer. The cocatalyst solvent is pentane which appears in the vent gas stream as the heavy hydrocarbon and in accordance with this invention pentane is concentrated in the monomer distillation column 110 to form the absorption solvent. No condensate forms in the vent gas cooler 84. About 94% of the ethylene in the reactor vent gas stream 72 is recovered in the absorption unit and recycled to the reactor in stream 78.

EXAMPLE 1

| Stream Component | 72 lb-mol/hr | 88 lb-mol/hr | 80 lb-mol/hr | 100 lb-mol/hr | 78 lb-mol/hr | 98 lb-mol/hr |
| --- | --- | --- | --- | --- | --- | --- |
| Hydrogen | 7.77 | 7.77 | 0.00 | 7.77 | 0.00 | 0.00 |
| Nitrogen | 119.71 | 119.71 | 0.00 | 119.71 | 0.00 | 0.00 |
| Methane | 1.55 | 1.55 | 0.00 | 1.53 | 0.02 | 0.00 |
| Ethylene | 12.44 | 12.44 | 0.00 | 0.79 | 11.65 | 0.91 |
| Ethane | 9.33 | 9.33 | 0.00 | 0.40 | 8.93 | 1.34 |
| n-Pentane | 4.66 | 4.66 | 0.00 | 0.38 | 4.28 | 222.75 |
| Total | 155.46 | 155.46 | 0.00 | 130.58 | 24.88 | 225.00 |
| Temperature, °F. | 100 | 100 | N/A | 95 | 165 | −25 |

| Stream Component | 72 lb-mol/hr | 88 lb-mol/hr | 80 lb-mol/hr | 100 lb-mol/hr | 78 lb-mol/hr | 98 lb-mol/hr |
|---|---|---|---|---|---|---|
| Pressure, psia | 15 | 397 | N/A | 377 | 325 | 400 |

The reactor vent gas stream 72 in Example 2 is from a reactor producing a copolymer of ethylene and 1-hexene; no heavy hydrocarbon solvent appears in the vent gas. In this case, the comonomer 1-hexene is the heavy component and in accordance with this invention is also the absorption solvent. In this case, about 9% of the vent gas stream condenses as stream 80 in the vent gas coolers 84. The condensate 80 consists essentially of 1-hexene and it is recycled to the reactor. The absorption unit recovers about 77% of the ethylene contained in the reactor vent gas stream 72 for recycle to the reactor through stream 78.

EXAMPLE 2

| Stream Component | 72 lb-mol/hr | 88 lb-mol/hr | 80 lb-mol/hr | 100 lb-mol/hr | 78 lb-mol/hr | 98 lb-mol/hr |
|---|---|---|---|---|---|---|
| Hydrogen | 67.16 | 67.12 | 0.04 | 67.12 | 0.00 | 0.00 |
| Nitrogen | 105.83 | 105.68 | 0.15 | 105.68 | 0.00 | 0.00 |
| Methane | 0.02 | 0.02 | 0.00 | 0.02 | 0.00 | 0.00 |
| Ethylene | 8.14 | 8.02 | 0.12 | 1.77 | 6.25 | 2.15 |
| Ethane | 0.20 | 0.20 | 0.00 | 0.04 | 0.16 | 0.07 |
| 1-Hexene | 22.16 | 3.68 | 18.48 | 0.12 | 3.56 | 220.00 |
| Total | 203.51 | 184.72 | 18.79 | 174.75 | 9.97 | 222.22 |
| Temperature, °F. | 100 | 100 | 100 | 95 | 273 | −25 |
| Pressure, psia | 15 | 397 | 133 | 377 | 325 | 400 |

The reactor vent gas stream in Example 3 is from a reactor producing a copolymer of ethylene and butene-1. Hexane is used as the cocatalyst solvent and appears in the reactor vent gas stream. In accordance with this invention, hexane is the heavy component and also the absorption solvent. No condensate 80 forms in the vent gas coolers 84 in this example. The absorption unit recovers almost all of the ethylene and butene-1 in the vent gas stream for recycle to the reactor through conduit 78.

EXAMPLE 3

| Stream Component | 72 lb-mol/hr | 88 lb-mol/hr | 80 lb-mol/hr | 100 lb-mol/hr | 78 lb-mol/hr | 98 lb-mol/hr |
|---|---|---|---|---|---|---|
| Hydrogen | 4.960 | 4.960 | 0.000 | 4.960 | 0.000 | 0.00 |
| Nitrogen | 21.776 | 21.776 | 0.000 | 21.776 | 0.000 | 0.00 |
| Methane | 0.020 | 0.020 | 0.000 | 0.018 | 0.002 | 0.00 |
| Ethylene | 9.446 | 9.446 | 0.000 | 0.000 | 9.445 | 0.00 |
| Ethane | 0.898 | 0.898 | 0.000 | 0.000 | 0.898 | 0.00 |
| 1-Butene | 4.242 | 4.242 | 0.000 | 0.004 | 4.238 | 0.77 |
| C4's | 0.258 | 0.258 | 0.000 | 0.001 | 0.257 | 0.08 |
| n-Hexane | 0.290 | 0.290 | 0.000 | 0.014 | 0.276 | 85.00 |
| Total | 41.890 | 41.890 | 0.000 | 26.774 | 15.116 | 85.86 |
| Temperature, °F. | 100 | 100 | N/A | 95 | 150 | −25 |
| Pressure, psia | 15 | 397 | N/A | 377 | 325 | 400 |

Although the present invention has been described in considerable detail with reference to the preferred embodiments discussed, other embodiments are possible and are readily understood by those skilled in the process engineering arts. Therefore, the spirit and scope of the appended claims are not limited to the specific preferred process embodiments described herein.

What is claimed is:

1. A process for recovering unreacted monomers in a gas phase olefin polymerization process, wherein vent gas stream(s) from the reactor purge or product purge tanks, said vent gas comprising inert light components and unreacted monomers, are treated in a process comprising the steps of:

(a) contacting the reactor vent gas stream(s) with an absorption solvent stream in an absorption zone, to produce an absorption zone overhead gas stream comprised of inert light components in major part, and an absorption zone bottoms liquid stream comprised of absorption solvent and absorbed monomers;

(b) fractionating the absorber bottoms stream in a distillation column to produce a distillation column overhead stream comprising monomers, and a distillation column bottoms stream comprising absorption solvent; and (c) feeding the bottoms stream from the distillation column to the absorption zone as the absorption solvent stream in step (a).

2. The process of claim 1 comprising the additional step of: conveying the distillation column overhead stream in step (b) into the polymerization reactor.

3. The process of claim 1 comprising the additional step of: conveying the distillation column overhead stream in step (b) into an ethylene/ethane splitter or to a light ends section of an olefins plant.

4. The process of claim 1 comprising the additional steps prior to contacting the reactor vent gas stream(s) with the absorption solvent stream of:

(i) compressing the reactor vent gas stream(s);

(ii) cooling the compressed vent gas stream(s) to form a condensate and separating the condensate from the compressed and cooled reactor vent gas stream(s); and (iii) conveying the condensate to the polymerization reactor or to a monomer recovery unit.

5. The process of claim 1 wherein the monomers comprise ethylene.

6. The process of claim 1 wherein the inert light components comprise nitrogen.

7. The process of claim 1 wherein the absorption solvent comprises a C4 to C10 hydrocarbon that is less volatile than the monomers.

8. A process for recovering unreacted monomers in a gas phase olefin polymerization process, wherein vent gas stream(s) from the reactor purge or product purge tanks, said vent gas comprising inert light components, unreacted monomers and heavy hydrocarbons, are treated in a process comprising the steps of:

(a) contacting the reactor vent gas stream(s) with an absorption solvent stream in an absorption zone, to produce an absorption zone overhead gas stream comprised of inert light components in major part and an absorption zone bottoms liquid stream comprised of absorption solvent, absorbed monomers and heavy hydrocarbons;

(b) fractionating the absorber bottoms stream in a distillation column to produce a distillation column overhead gas stream comprising monomers and a distillation column bottoms stream comprising heavy hydrocarbons that are derived from the reactor vent gas stream(s); and (c) conveying the bottoms stream from the distillation column to the absorption zone as the absorption solvent stream in step (a).

9. The process of claim 8 comprising the additional step of: conveying the distillation column overhead stream in step (b) into the polymerization reactor.

10. The process of claim 8 comprising the additional step of: conveying the distillation column overhead stream in step (b) into an ethylene/ethane splitter or to the light ends section of an olefins plant.

11. The process of claim 8 comprising the additional steps prior to contacting the reactor vent gas stream(s) with the absorption solvent stream of:

(i) compressing the reactor vent gas stream(s);

(ii) cooling the compressed vent gas stream(s) to form a condensate and separating the condensate from the compressed and cooled reactor vent gas stream(s); and (iii) conveying the condensate to the polymerization reactor or to a monomer recovery unit.

12. The process of claim 8 wherein the monomers comprise ethylene.

13. The process of claim 8 wherein the inert light components comprise nitrogen.

14. The process of claim 8 wherein the heavy hydrocarbons are comprised of C4 to C10 hydrocarbons.

15. The process of claim 8 wherein a cocatalyst is fed into the reactor dissolved in a catalytically inert hydrocarbon solvent that is less volatile than the monomers and the cocatalyst solvent is the heavy hydrocarbon of step (b).

16. The process of claim 8 wherein a catalytically inert hydrocarbon liquid less volatile than the monomers is fed into the reactor and vaporizes in the reactor to absorb heat of polymerization and the inert hydrocarbon fluid is less volatile than the monomers.

17. The process of claim 8 wherein the absorption solvent comprises the least volatile monomer of the unreacted monomers.

18. The process of claim 1 or 8 wherein the absorption zone is an absorber stripper, the process comprising the additional step of: reboiling or both reboiling and interreboiling the absorber stripper bottoms stream so as to strip light components out of the absorber stripper bottoms stream.

19. The process of claim 1 or 8 wherein the absorption zone is an absorber stripper, the process comprising the additional step of: intercooling the absorber stripper.

20. The process of claim 1 or 8 wherein the distillation column is refluxed and reboiled and column bottoms are accumulated in an accumulation zone, the process comprising the additional step of: adjusting the reflux and reboil rates to control bottoms inventory in the accumulation zone within a specified range.

21. The process of claim 1 or 8 wherein the distillation column is refluxed and reboiled, the process comprising the additional step of: adjusting the reflux and reboil rates to control the average molecular weight of the distillation column bottoms stream at a specified value.

22. The process of claim 1 or 8 comprising the additional steps of:

(d) depressuring the overhead gas stream from the absorption zone across an expansion device to partially condense the overhead gas stream into liquid condensate; and (e) separating and conveying the condensate to the absorption zone or the distillation column.

23. The process of claim 22 wherein the expansion device is an expander.

24. The process of claim 22 wherein the expansion device is a pressure letdown valve.

25. The process of claims 1 or 8 wherein the vent gas stream(s) comprise inert light components in major part.

* * * * *

UNITED STATES PATENT AND TRADEMARK OFFICE
CERTIFICATE OF CORRECTION

PATENT NO. : 5,521,264
DATED : May 28, 1996
INVENTOR(S) : YUV R. MEHRA/ROBERT H. STODGHILL

It is certified that error appears in the above-indentified patent and that said Letters Patent is hereby corrected as shown below:

On the title page, item [22] Filed: should read --March 3, 1995--.

Signed and Sealed this

Seventeenth Day of September, 1996

Attest:

BRUCE LEHMAN

*Attesting Officer*   *Commissioner of Patents and Trademarks*